(12) United States Patent
Kim

(10) Patent No.: US 9,962,567 B2
(45) Date of Patent: *May 8, 2018

(54) CONNECTING DEVICE

(71) Applicant: Bong Kwan Kim, Jinju-si (KR)

(72) Inventor: Bong Kwan Kim, Jinju-si (KR)

(*) Notice: Subject to any disclaimer, the term of this patent is extended or adjusted under 35 U.S.C. 154(b) by 0 days. days.

This patent is subject to a terminal disclaimer.

(21) Appl. No.: 15/309,976

(22) PCT Filed: May 7, 2015

(86) PCT No.: PCT/KR2015/004541
§ 371 (c)(1),
(2) Date: Nov. 9, 2016

(87) PCT Pub. No.: WO2015/174680
PCT Pub. Date: Nov. 19, 2015

(65) Prior Publication Data
US 2017/0151452 A1    Jun. 1, 2017

(30) Foreign Application Priority Data
May 10, 2014  (KR) ........................ 10-2014-0056015

(51) Int. Cl.
*A62C 35/00*  (2006.01)
*A62C 33/04*  (2006.01)
*B05B 1/30*   (2006.01)
*A62C 33/00*  (2006.01)
*A62C 33/06*  (2006.01)
(Continued)

(52) U.S. Cl.
CPC ............. *A62C 33/04* (2013.01); *A62C 33/00* (2013.01); *A62C 33/06* (2013.01); *B05B 1/302* (2013.01); *B05B 1/3026* (2013.01); *F16K 5/0636* (2013.01); *F16K 5/0647* (2013.01); *F16K 31/535* (2013.01)

(58) Field of Classification Search
CPC ......... A62C 33/04; A62C 33/00; A62C 33/06; F16K 5/0636; F16K 5/0647; F16K 31/535; B05B 1/3026; B05B 1/302
USPC ...... 169/14–16; 239/537, 538, 581.1, 582.1; 251/248, 315.01
See application file for complete search history.

(56) References Cited

U.S. PATENT DOCUMENTS 1,569,285 A * 1/1926 Katona ................... F16K 31/44
                                                                251/249.5
8,556,230 B2 * 10/2013 Combs ................... A62C 35/68
                                                                251/248

FOREIGN PATENT DOCUMENTS

KR    10-2001-0085093 A    9/2001
KR    10-0709383 B1        4/2007
KR    10-2008-0068347 A    7/2008
(Continued)

OTHER PUBLICATIONS

International Search Report issued in corresponding application No. PCT/KR2015/004541 dated Jun. 29, 2015 (4 pages).
(Continued)

*Primary Examiner* — Steven J Ganey
(74) *Attorney, Agent, or Firm* — Osha Liang LLP

(57) ABSTRACT

Disclosed is a connecting device. The disclosed connecting device includes a connecting unit whose inside is penetrated and opened and closed according to rotation of a rotor provided therein, and an opening/closing unit that is rotatably coupled to the connecting unit and opens and closes the inside of the connecting unit by rotating the rotor, when being rotated with respect to the connecting unit.

12 Claims, 10 Drawing Sheets

(51) Int. Cl.
*F16K 31/53* (2006.01)
*F16K 5/06* (2006.01)

(56) References Cited

FOREIGN PATENT DOCUMENTS

KR   10-1094942 B1   12/2011
KR   10-1291335 B1   7/2013

OTHER PUBLICATIONS

Written Opinion of the International Searching Authority issued in corresponding application No. PCT/KR2015/004541 dated Jun. 29, 2015 (6 pages).

* cited by examiner

CONNECTING DEVICE

TECHNICAL FIELD

The present invention relates to a connecting device, and more particularly, to a connecting device that connects a plurality of hoses or pipes, and adjusts the movement of a fluid.

BACKGROUND ART

A connecting device that is generally applied to connect hoses or pipes corresponds to a device that connects a plurality of hoses or pipes to extend the overall length of the hose or pipe and adjust the movement of a fluid flowing through the connecting device.

In particular, a connecting device that connects fire hoses or pipes is required to connect a long distance from a fire truck to a fire point and supply water in a situation in which the entry of a fire truck to the fire is difficult due to vehicles, various obstacles, and the like at the time of fire fighting, and therefore the connecting device may connect a plurality of hoses each having a length of approximately 15 m to extend the overall length of the connected hoses through which water is supplied.

In FIGS. 1 to 4, a general connecting device for connecting hoses or pipes is disclosed. The general connecting device 30 includes a rotor 31 provided therein, a cap 32 provided at one side of the connecting device 30, and a handle 34 coupled to an upper portion of a shaft 33 coupled to the rotor 31.

Thus, when rotating the handle 34 in a case of opening and closing the general connecting device 30, the inside of the connecting device 30 may be opened and closed while the rotor 31 is rotated by the shaft 33.

However, the above-described general connecting device has a problem in that it may be bent against or collide with corners or the like, or the handle may be caught by the corners or the like while being moved in alleys or stairs so that the connecting device may malfunction or the movement of the connecting device may be disturbed.

In addition, in the case of the general connecting device, the water pressure applied to a fire hose rapidly increases when the nozzle of the fire hose is closed, so that the movement and manipulation of the hose becomes inconvenient due to an increase in the weight of the hose, and a hydrant valve or the like should be separately manipulated in order to adjust the hydraulic pressure inside the hose.

PRIOR ART DOCUMENT

Patent Document (Patent Document 1) Republic of Korea Patent Application Registration No. 10-1291335 B1 (Jul. 30, 2013)

DISCLOSURE

Technical Problem

The present invention is directed to providing a connecting device that prevents a protrusion of a lever or the like to the outside of the connecting device to prevent the malfunction and movement disturbance of the connecting device, thereby stably controlling the movement of a fluid.

Technical Solution

One aspect of the present invention provides a connecting device including: a connecting unit whose inside is penetrated and opened and closed according to rotation of a rotor provided therein; and an opening/closing unit that is rotatably coupled to the connecting unit, and opens and closes the inside of the connecting unit by rotating the rotor, when being rotated with respect to the connecting unit.

Here, the connecting unit may include a connecting unit body whose inside is penetrated, a protrusion unit that is coupled to the connecting unit body and communicates with the connecting unit body, to which the opening/closing unit is rotatably coupled, and whose inside is opened and closed according to the rotation of the rotor, and a rotor rotating unit that is rotatably coupled to the protrusion unit, coupled at its end to the rotor, and rotates the rotor in conjunction with the rotation of the opening/closing unit.

Also, a connecting unit knob may protrude from an outer circumferential surface of the connecting unit body.

Also, the connecting device may further include a cap that is detachably coupled to the connecting unit and fixes the opening/closing unit to the connecting unit.

Also, the protrusion unit may include a protrusion unit body that protrudes toward a front side of the connecting unit body to have a smaller diameter than that of the connecting unit body, so that an insertion hole is formed inside the protrusion unit body, and a shaft insertion hole that passes through an upper portion of the protrusion unit body to communicate with the insertion hole.

Also, the protrusion unit may further include a connecting unit packing that is provided on an inner circumferential surface of the protrusion unit body and seals between the protrusion unit body and the rotor.

Also, the rotor may be rotatably inserted into the protrusion unit, include a drainage hole that is horizontally penetrated, and include a shaft insertion groove formed in an upper portion thereof so that the rotor rotating unit is coupled to the rotor.

Also, the rotor rotating unit may include a rotating unit body that includes a gear provided on an outer circumferential surface thereof, so that the gear is engaged with the opening/closing unit and rotated, and a gear shaft that protrudes from the rotating unit body, and passes through the protrusion unit and is coupled to the rotor.

Also, the rotor rotating unit may further include a wear-resistant cap that is coupled to an upper portion of the rotating unit body and prevents abrasion of the rotating unit body.

Also, the rotor rotating unit may further include a rotating unit oil ring that is provided on an outer circumferential surface of the gear shaft and seals between the gear shaft and the rotor.

Also, the opening/closing unit may include an opening/closing unit body that includes a through-hole provided therein and an opening/closing unit knob protrusively formed on an outer circumferential surface thereof, a gear insertion groove that is concavely formed on an inner circumferential surface of the opening/closing unit body so that the rotor rotating unit is accommodated in the gear insertion groove, and a gear groove that is provided along an inner circumferential surface of the gear insertion groove and engaged with the rotor rotating unit.

Also, the cap may include a cap body that is penetrated in its inside and communicates with the connecting unit, and a cap screw portion that is provided on an outer circumferential surface of the cap body and screwed to the connecting unit.

Also, the cap may further include a cap packing that is coupled to an inner circumferential surface of the cap body and seals between the cap body and the rotor, and a cap oil ring that is provided on an outer circumferential surface of the cap body or the cap screw portion and seals between the cap body or the cap screw portion with the connecting unit.

Also, a hose may be connected to each of the connecting unit and the cap.

Also, the hose may be a fire hose.

Advantageous Effects

The connecting device according to the present invention may prevent the connecting device from malfunctioning or being caught by obstacles or the like during the movement of the connecting device by accommodating a rotor rotating unit for rotating a rotor to the inside of an opening/closing unit.

In addition, the connecting device according to the present invention may adjust a flow rate passing through the connecting device in accordance with a degree of the movement of the opening/closing unit with respect to a connecting unit.

In addition, the connecting device according to the present invention may prevent the leakage of a fluid by adopting a packing, an oil ring, or the like.

In addition, the connecting device according to the present invention may achieve excellent assemblability and ease of repair and management by detachably coupling the connecting unit, the opening/closing unit, and a cap.

MODES OF THE INVENTION

Hereinafter, an embodiment of a connecting device according to the present invention will be described with reference to the accompanying drawings. The thickness of the lines and size of the components shown in the figure in this process may have been exaggerated for convenience and clarity of description.

In addition, the terminology described below is defined considering functions in the present invention and may vary according to a user's or operator's intention or usual practice. Thus, the meanings of the terminology should be interpreted based on the overall context of the present specification.

Figure 1:
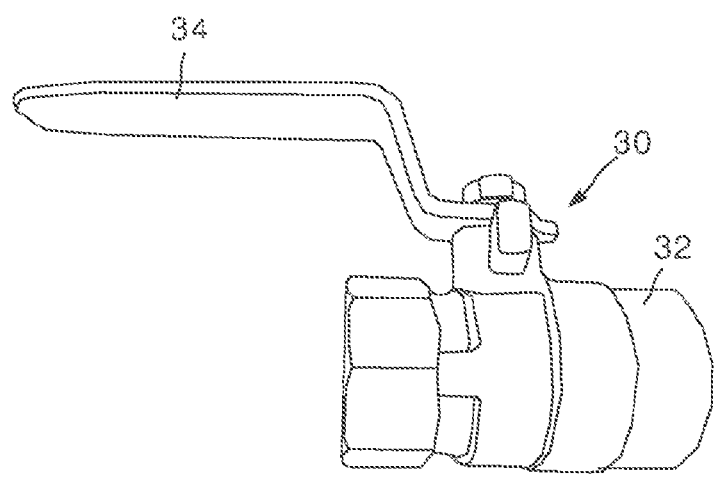
FIG. 1 is a view showing a first embodiment of a general connecting device.
Figure 2:
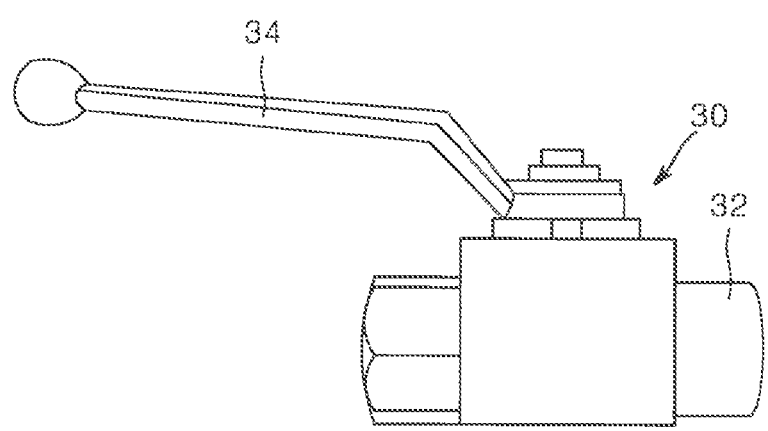
FIG. 2 is a view showing a second embodiment of a general connecting device.
Figure 3:
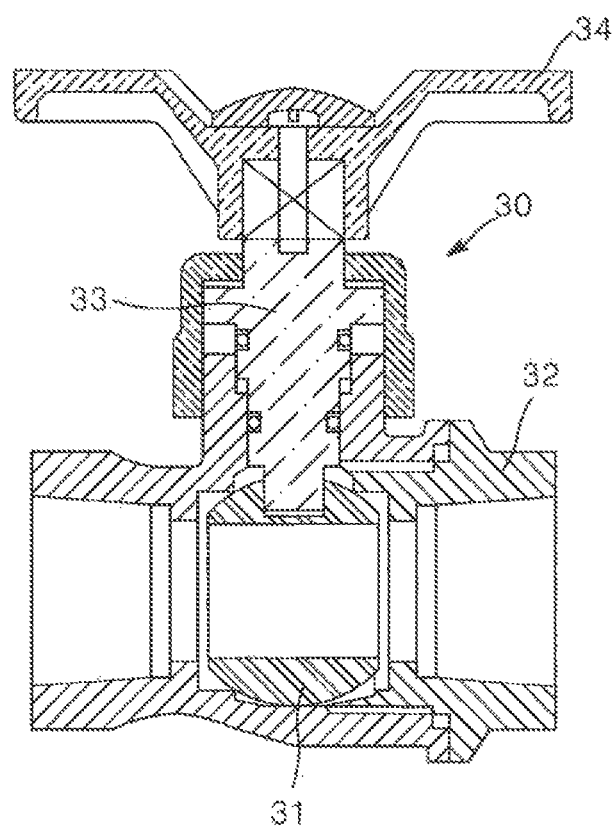
FIG. 3 is a view showing a third embodiment of a general connecting device.
Figure 4:
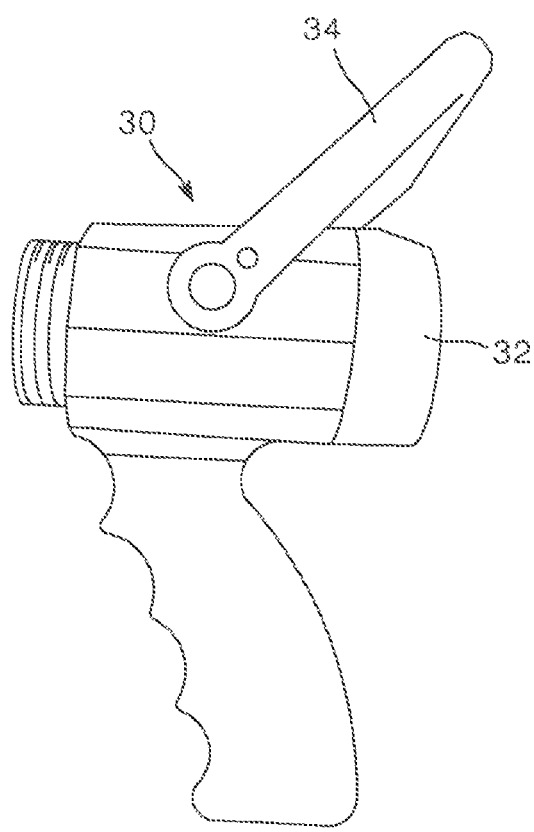
FIG. 4 is a view showing a fourth embodiment of a general connecting device.
Figure 5:
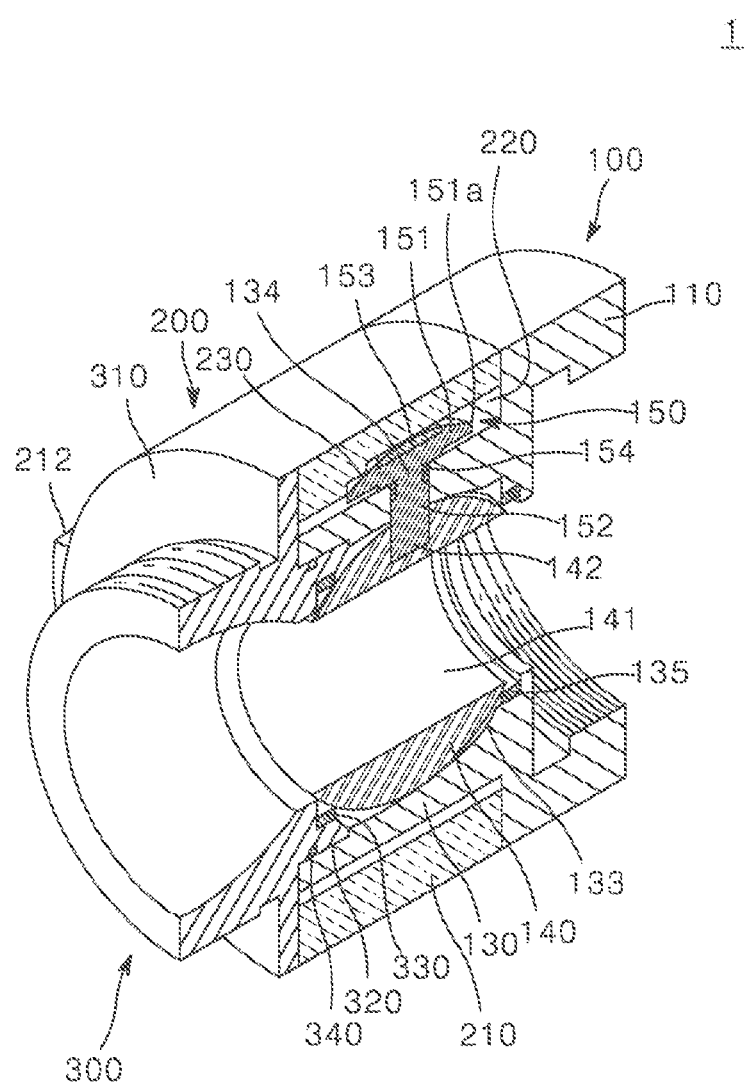
FIG. 5 is a perspective cross-sectional view showing the inside of a connecting device according to an embodiment of the present invention.
Figure 6:
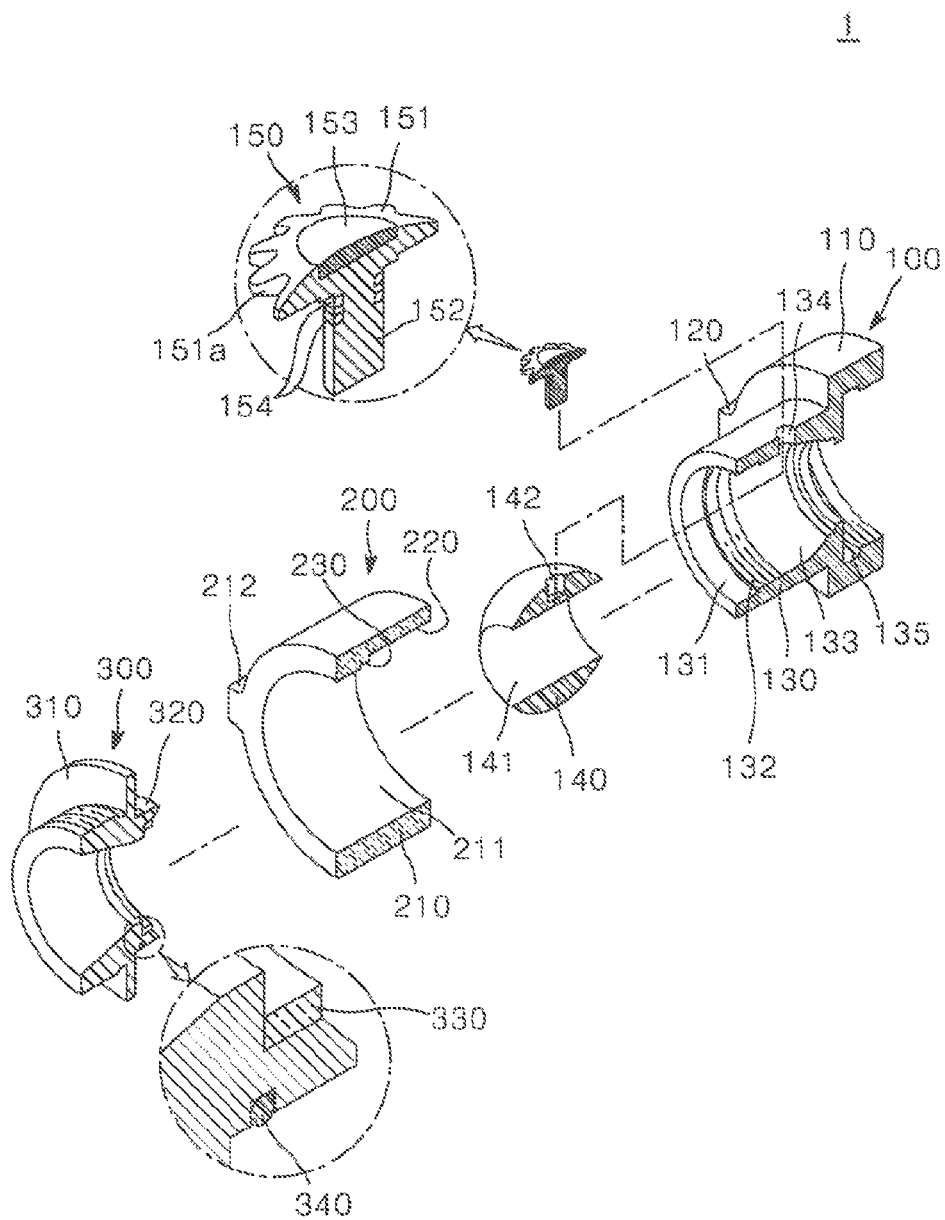
FIG. 6 is an exploded view showing inner components of a connecting device according to an embodiment of the present invention.
Figure 7:
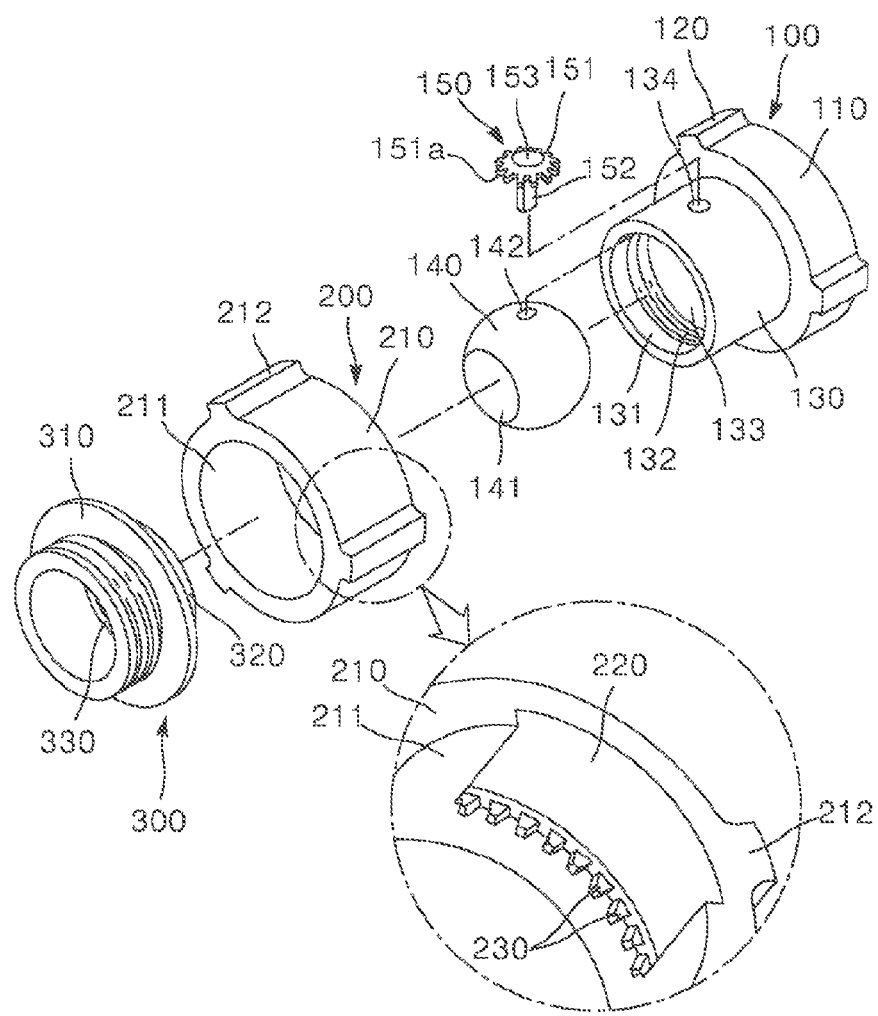
FIG. 7 is a perspective view showing components of a connecting device according to an embodiment of the present invention.
Figure 8:
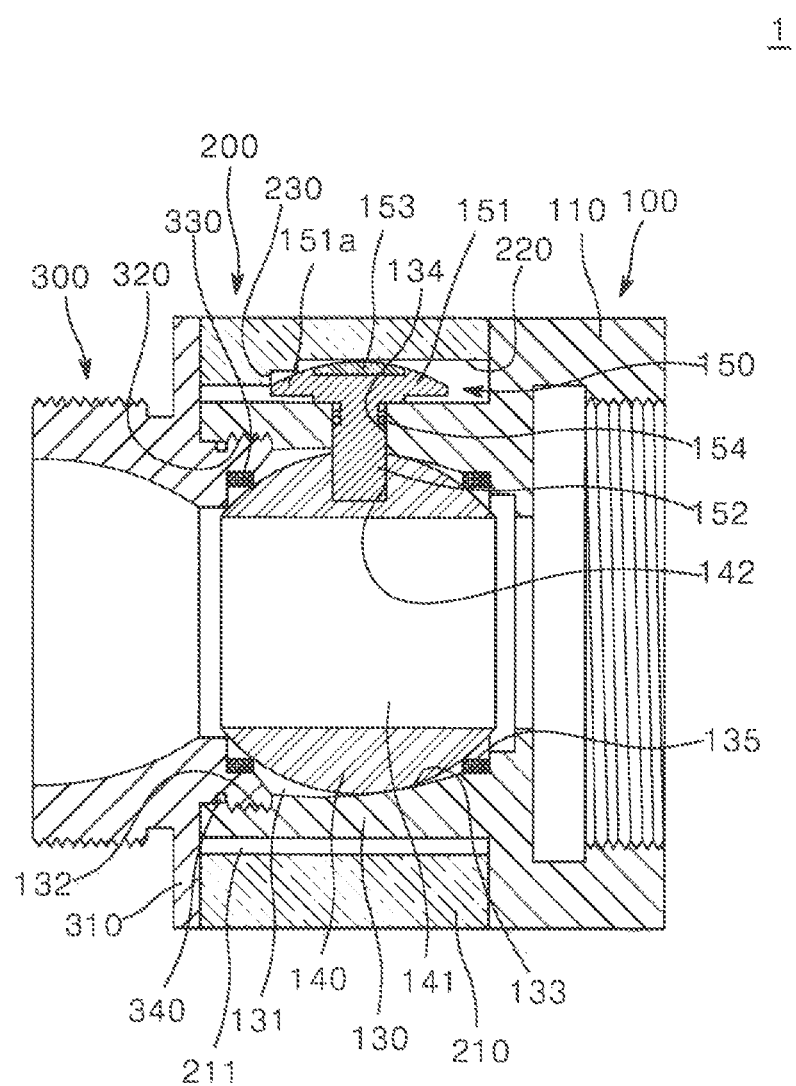
FIG. 8 is a cross-sectional view showing a connecting device according to an embodiment of the present invention.

FIG. 5 is a perspective cross-sectional view showing the inside of a connecting device according to an embodiment of the present invention. FIG. 6 is an exploded view showing inner components of a connecting device according to an embodiment of the present invention. FIG. 7 is a perspective view showing components of a connecting device according to an embodiment of the present invention, and FIG. 8 is a cross-sectional view showing a connecting device according to an embodiment of the present invention.

Referring to FIGS. 5 to 8, a connecting device 1 according to an embodiment of the present invention includes a connecting unit 100 and an opening/closing unit 200. In the present embodiment, the connecting device 1 corresponds to a device that connects a plurality of hoses such as fire hoses or the like to extend the overall length of the hose for guiding the movement of a fluid, or adjust the movement of a fluid flowing through the hose.

Obviously, the connecting device may be mounted in a variety of devices through which a fluid flows such as pipes, tubes, or the like other than the fire hoses, and thereby may extend the movement distance of the fluid and control the flow of the fluid.

The connecting unit 100 is penetrated in its approximately central portion, and the inside of the connecting unit 100 is opened and closed in accordance with rotation of a rotor 140 provided in the connecting unit 100. In the present embodiment, the connecting unit 100 includes a connecting unit body 110, a protrusion unit 130, and a rotor rotating unit 150.

The connecting unit body 110 is horizontally penetrated in its approximately central portion, and includes a thread formed on an inner circumferential surface thereof, so that the thread is coupled to a hose or a cap 300 which will be described later. In the present embodiment, the connecting unit body 110 includes connecting unit knobs 120 that protrude outward in a radial position of an outer circumferential surface thereof, so that a user grips the connecting unit knobs 120 to prevent the connecting unit knobs 120 from sliding when applying a rotational force.

In the present embodiment, a plurality of connecting unit knobs 120 are arranged along the outer circumferential surface of the connecting unit body 110, and the surface of the connecting unit knobs 120 is subjected to curved processing in order to prevent the connecting unit body 110 from being caught by obstacles such as railings or stairs when the connecting unit body 110 is moved.

The protrusion unit 130 protrudes forward (a left direction on the basis of FIG. 8) from a front surface (a left surface on the basis of FIG. 8) of the connecting unit body 110, so that the rotor 140 is rotatably inserted into the protrusion unit 130. In the present embodiment, the protrusion unit 130 is formed integrally with the connecting unit body 110, and made of a metallic material.

In the present embodiment, the protrusion unit 130 protrudes forward from the front surface of the connecting unit body 110 so as to have a smaller diameter than that of the connecting unit body 110 so that an insertion hole 131 is formed inside the protrusion unit 130, and a protrusion unit screw portion 132 is formed on a front inner circumferential surface of the insertion hole 131 and screwed to the cap 300.

The rotor rotating unit 150 is rotatably coupled to an upper portion of the protrusion unit 130 and rotates the rotor 140.

An arcuate curved support 133 is provided at a rear side (a right direction on the basis of FIG. 8) of the protrusion unit screw portion 132 so as to protrude inward along an inner circumferential surface of the insertion hole 131, and a shaft insertion hole 134 is vertically penetrated in an approximately upper central portion of the protrusion unit 130 so as to communicate with the insertion hole 131, so that the rotor rotating it 150 is inserted into the shaft insertion hole 134.

In addition, a connecting unit packing 135 is provided on the inner circumferential surface of the insertion hole 131 at a rear side of the curved support 133 to seal between the protrusion unit 130 or the connecting unit body 110 and the rotor 140.

In the present embodiment, the rotor 140 is formed in an approximately spherical shape to be rotatably inserted into the insertion hole 131, and a drainage hole 141 that is horizontally (on the basis of FIG. 8) penetrated is provided to adjust the flow of a fluid through the protrusion unit 130 or the connecting unit body 110 in accordance with the rotation.

In addition, in the present embodiment, a shaft insertion groove 142 is provided in an approximately upper central portion of the rotor 140 and coupled to the rotor rotating unit 150.

The rotor rotating unit 150 includes a rotating unit body 151 and a gear shaft 152. A gear 151a is formed on an outer circumferential surface of the rotating unit body 151 and engaged with the connecting unit 100. The gear shaft 152 protrudes to a lower side on the basis of FIG. 8) of the rotating unit body 151 and passes through an upper central portion of the protrusion unit 130, so that an end of the gear shaft 152 is coupled to the rotor 140, specifically, the shaft insertion groove 142.

In the present embodiment, the rotor rotating unit 150 further includes a wear-resistant cap 153. The wear-resistant cap 153 is coupled to an approximately upper central portion of the rotating unit body 151 to prevent abrasion caused by friction of the rotating unit body 151 and the opening/closing unit 200. In the present embodiment, the wear-resistant cap 153 is made of a material such as Teflon or resin, and inserted into the approximately upper central portion of the rotating unit body 151.

In addition, in the present embodiment, the rotor rotating unit 150 further includes a rotating unit oil ring 154. The rotating unit oil ring 154 is fitted into an outer circumferential surface of the gear shaft 152 to seal between the gear shaft 152 and the rotor 140. In the present embodiment, the rotating unit oil ring 154 is mounted in ring grooves (reference numerals being not shown) which are formed to be vertically spaced apart from each other on the outer circumferential surface of the gear shaft 152.

The opening/closing unit 200 is rotatably coupled to the connecting unit 100, and opens and closes the inside of the connecting unit 100 by rotating the rotor 140 when rotating with respect to the connecting unit 100.

Figure 9:
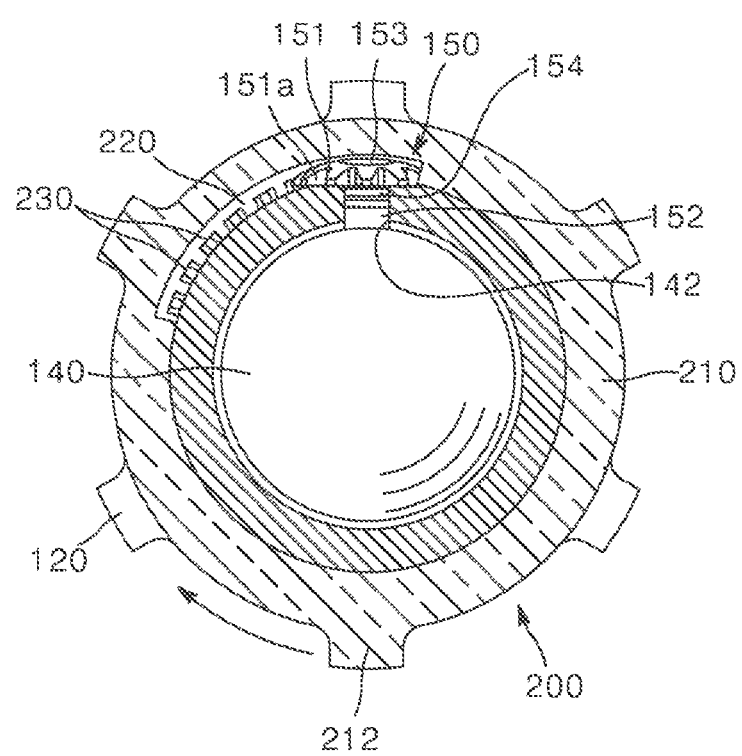
FIG. 9 is a front view showing a state in which the inside of a connecting unit of a connecting device according to an embodiment of the present invention is closed.
Figure 10:
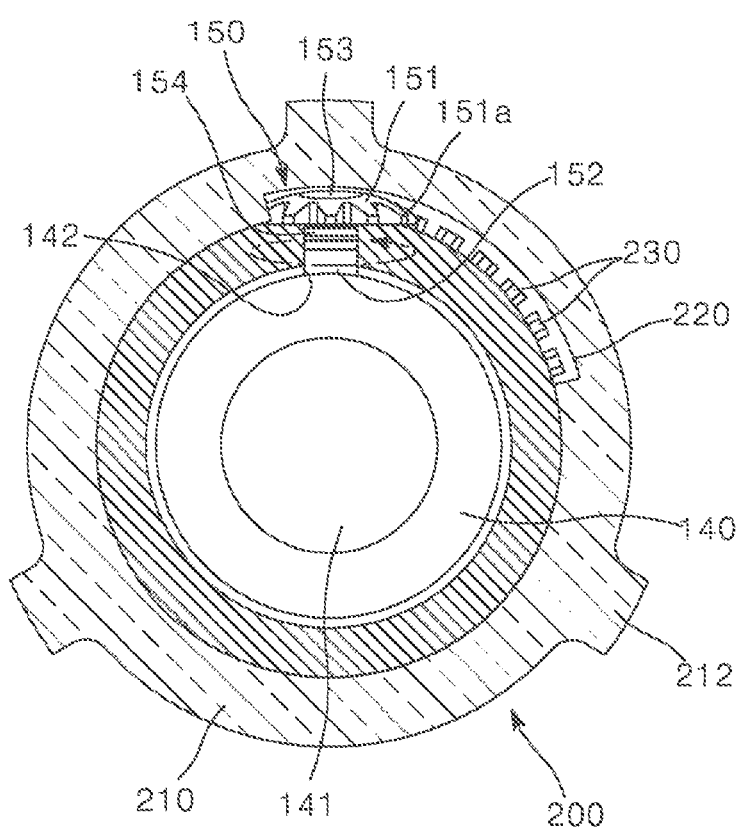
FIG. 10 is a view showing a state in which the inside of a connecting unit of a connecting device according to an embodiment of the present invention is opened.

FIG. 9 is a front view showing a state in which the inside of a connecting unit of a connecting device according to an embodiment of the present invention is closed, and FIG. 10 is a view showing a state in which the inside of a connecting unit of a connecting device according to an embodiment of the present invention is opened.

Referring to FIGS. 5, 8, 9, and 10, in the present embodiment, the opening/closing unit 200 is coupled to the protrusion unit 130 and rotated with respect to the protrusion unit 130, thereby opening and closing the inside of the protrusion unit 130. In the present embodiment, the opening/closing unit 200 includes a through-hole 211 that is horizontally (on the basis of FIG. 8) penetrated in its approximately inner central portion. In addition, in the present embodiment, the opening/closing unit 200 includes an opening/closing unit body 210, a gear insertion groove 220, and a gear groove 230.

The opening/closing unit body 210 includes a through-hole formed therein, and the same number of opening; closing unit knobs 212 as the number of the connecting unit knobs 120 protrude from a position corresponding to the connecting unit knobs 120 on an outer circumferential surface of the opening/closing unit body 210.

The gear insertion groove 220 is concavely formed on an upper inner circumferential surface of the opening/closing unit body 210 at the rear side (a right direction on the basis of FIG. 8) thereof, so that the rotor rotating unit 150 is accommodated in the gear insertion groove 220. The gear groove 230 is provided along an inner surface of the gear insertion groove 220 on a front (a left direction on the basis of FIG. 8) inner surface thereof, and engaged with the rotor rotating unit 150, specifically, the gear 151a.

In the present embodiment, the connecting device 1 further includes the cap 300. The cap 300 is detachably coupled to the connecting unit 100 to fix the opening/closing unit 200 to the connecting unit 100. In the present embodiment, the cap 300 includes a cap body 310 and a cap screw portion 320.

The inside of the cap body 310 is horizontally (on the basis of FIG. 8) penetrated and communicates with the connecting unit 100. The cap screw portion 320 protrudes to a rear side (a right direction on the basis of FIG. 8) of the cap body 310, and a screw thread is formed on the cap screw portion 320 and screw-coupled to the connecting unit body 110 or the protrusion unit 130.

In the present embodiment, the cap 300 further includes a cap packing 330 and a cap oil ring 340. The cap packing 330 is coupled to an inner circumferential surface of the cap body 310 and seals between the cap body 310 and the rotor 140. The cap oil ring 340 is provided in the cap body 310 or the cap screw portion 320 and seals between the cap body 310 or the cap screw portion 320 and the connecting unit 100.

In the present embodiment, the cap 300 allows the opening/closing unit 200 to be rotatably coupled to the connecting unit 100 in such a manner as to be screwed to the protrusion unit 130 or the connecting unit body 110 in a state in which the opening/closing unit 200 is interposed between the connecting unit body 110 and the cap body 310.

Hereinafter, an operation principle and effect of the connecting device 1 according to the present embodiment will be described.

In the present embodiment, the rotor 140 is first inserted into the insertion hole 131 inside the protrusion unit 130 in order to assemble the connecting device 1. At this point, the shaft insertion groove 142 provided in the upper central portion of the rotor 140 is allowed to be located on the same vertical line with the shaft insertion hole 134 of the protrusion unit 130, and the rotor rotating unit 150, specifically, the gear shaft 152 is inserted into the shaft insertion hole 134 so that a lower end portion of the gear shaft 152 is coupled to the shaft insertion groove 142.

When the rotor rotating unit 150 is coupled to the rotor 140, the opening/closing unit 200 is coupled to the protrusion unit 130 in such a manner that the protrusion unit 130 is inserted into the through-hole 211 provided inside the opening/closing unit body 210.

At this point, the rotor rotating unit 150 protruding from the upper portion of the protrusion unit 130, specifically, the rotating unit body 151 is inserted into the gear insertion groove 220 provided on an upper inner circumferential surface of the opening/closing unit 200, and the gear 151a provided on the outer circumferential surface of the rotating unit body 151 is engaged with the gear groove 230.

When the opening/closing unit 200 and the connecting unit 100 are coupled to each other, the cap 300 is coupled to the connecting unit 100 by screwing the cap screw portion 320 to the protrusion unit screw portion 132.

When the cap 300 is screwed to the connecting unit 100, the cap body 310 of the cap 300 supports the opening/closing unit body 210 of the opening/closing unit 200 in a direction (a right direction on the basis of FIG. 8) of the connecting unit body 110, and the cap packing 330 provided inside the cap screw portion 320 is brought into close contact with the rotor 140.

Next, the connecting unit packing 135 is brought into close contact with the rotor 140 while the rotor 140 is supported by the curved support 133 provided to protrude inward from the inner circumferential surface of the insertion hole 131 of the protrusion unit 130.

As described above, the connecting unit packing 135 and the cap packing 330 of the cap 300 are brought into close contact with the rotor 140, so that sealing between the rotor 140 with the connecting unit 100 and the inside of the cap 300 is maintained, and the cap oil ring 340 provided between the cap body 310 and the cap screw portion 320 is brought into close contact with the inner circumferential surface of the front insertion hole 131 of the protrusion unit screw portion 132 of the protrusion unit 130 so that sealing between the insertion hole 131 of the protrusion unit 130 and the cap 300, specifically the cap screw portion 320 is maintained.

Accordingly, oil such as lubricant injected between an outer circumferential surface of the protrusion unit 130 and an inner circumferential surface of the opening/closing unit body 210 is prevented from flowing into the insertion hole 131 inside the protrusion unit 130.

In addition, referring to FIG. 9, the opening/closing unit knobs 212 provided to protrude outward from the outer circumferential surface of the opening/closing unit body 210 are located to cross with the connecting unit knobs 120, and in this state, the drainage hole 141 of the rotor 140 is located in a state of being rotated in a direction perpendicular to the insertion hole 131 of the protrusion unit 130, so that the flow of a fluid through the connecting device 1 is shut off.

In addition, referring to FIG. 10, when the opening/closing unit knobs 212 of the opening/closing unit 200 are rotated in a clockwise direction so as to have the same position as the connecting unit knobs 120, the gear groove 230 is rotated along the opening/closing unit body 210.

When the gear groove 230 is rotated, a rotational force is transmitted to the rotating unit body 151 through the gear 151a engaged with the gear groove 230, so that the rotating unit body 151 is rotated and the rotor 140 is rotated by 90° by the gear shaft 152 coupled to the shaft insertion groove 142. When the rotor 140 is rotated, a penetration direction of the drainage hole 141 is parallel to or coincides with a penetration direction of the insertion hole 131, so that the inside of the connecting device 1 is opened.

At this point, a plurality of rotating unit oil rings 154 provided in an upper portion of the gear shaft 152 of the rotor rotating unit 150 are brought into close contact with an inner circumferential surface of the shaft insertion hole 134 of the protrusion unit 130, so that oil such as lubricant injected between the outer circumferential surface of the protrusion unit 130 and an inner circumferential surface of the through-hole 211 of the opening/closing unit body 210 of the opening/closing unit 200 is prevented from flowing into the inner insertion hole 131 through the shaft insertion hole 134.

In addition, the wear-resistant cap 153 is provided in the upper central portion of the rotating unit body 151 of the rotor rotating unit 150 to prevent the rotating unit body 151 from being worn.

As described above, when the connecting device 1 according to the present embodiment is used to connect fire hoses or the like, a degree to which a plurality of connecting devices 1 connecting a plurality of hoses are opened may be adjusted to reduce the water pressure and weight of the hose, thereby reducing accidents and improving usability.

In addition, in the connecting device 1 according to the present embodiment, the connecting unit 100, the opening/closing unit 200, and the cap 300 may be detachably coupled to one another to facilitate the assembly and disassembly of the device, and the overall length of the hose may be extended and the movement of a fluid through the hose may be adjusted by adopting a plurality of connecting devices 1.

In addition, in the connecting device 1 according to the present embodiment, the rotor rotating unit 150 may be located inside the opening/closing unit 200, so that a protrusion component such as a lever may be minimized and the connecting device 1 may be prevented from malfunctioning due to being caught by stairs or obstacles during the movement of the device.

In the connecting device 1 according to the present embodiment, a packing or the like may be applied among the connecting unit 100, the opening/closing unit 200, and the cap 300 to have therebetween, so that the connecting device 1 may be used as a variety of valves used in the home, gas valves, water supply and drainage valves, valves of chemical plants or oil refineries, or the like.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

The invention claimed is:

1. A connecting device comprising:
 a connecting unit whose inside is penetrated and opened and closed according to rotation of a rotor provided therein,
 wherein the connecting unit includes:
  a connecting unit body whose inside is penetrated,
  a protrusion unit that is coupled to the connecting unit body and communicates with the connecting unit body, to which the opening/closing unit is rotatably coupled, and whose inside is opened and closed according to the rotation of the rotor,
  a rotor rotating unit that is rotatably coupled to the protrusion unit, coupled at its end to the rotor, and rotates the rotor in conjunction with the rotation of the opening/closing unit,
  wherein the rotor rotating unit includes a rotating unit body that includes a gear provided on an outer circumferential surface thereof, so that the gear is engaged with the opening/closing unit and rotated, and a gear shaft that protrudes from the rotating unit body, and passes through the protrusion unit and is coupled to the rotor, and wherein the rotor rotating unit further includes a wear-resistant cap that is coupled to an upper portion of the rotating unit body and prevents abrasion of the rotating unit body; and an opening/closing unit that is rotatably coupled to the connecting unit, and opens and closes the inside of the connecting unit by rotating the rotor, when being rotated with respect to the connecting unit.

2. The connecting device of claim 1, wherein a connecting unit knob protrudes from an outer circumferential surface of the connecting unit body.

3. The connecting device of claim 1, further comprising: a cap that is detachably coupled to the connecting unit and fixes the opening/closing unit to the connecting unit.

4. The connecting device of claim 3, wherein the cap includes a cap body that is penetrated in its inside and communicates with the connecting unit, and a cap screw portion that is provided on an outer circumferential surface of the cap body and screwed to the connecting unit.

5. The connecting device of claim 4, wherein the cap further includes a cap packing that is coupled to an inner circumferential surface of the cap body and seals between the cap body and the rotor, and a cap oil ring that is provided on an outer circumferential surface of the cap body or the cap screw portion and seals between the cap body or the cap screw portion with the connecting unit.

6. The connecting device of claim 3, wherein a hose is connected to each of the connecting unit and the cap.

7. The connecting device of claim 6, wherein the hose is a fire hose.

8. The connecting device of claim 1, wherein the protrusion unit includes a protrusion unit body that protrudes toward a front side of the connecting unit body to have a smaller diameter than that of the connecting unit body, so that an insertion hole is formed inside the protrusion unit body, and a shaft insertion hole that passes through an upper portion of the protrusion unit body to communicate with the insertion hole.

9. The connecting device of claim 8, wherein the protrusion unit further includes a connecting unit packing that is provided on an inner circumferential surface of the protrusion unit body and seals between the protrusion unit body and the rotor.

10. The connecting device of claim 1, wherein the rotor is rotatably inserted into the protrusion unit, includes a drainage hole that is horizontally penetrated, and includes a shaft insertion groove formed in an upper portion thereof so that the rotor rotating unit is coupled to the rotor.

11. The connecting device of claim 1, wherein the rotor rotating unit further includes a rotating unit oil ring that is provided on an outer circumferential surface of the gear shaft and seals between the gear shaft and the rotor.

12. The connecting device of claim 1, wherein the opening/closing unit includes an opening/closing unit body that includes a through-hole provided therein and an opening/closing unit knob protrusively formed on an outer circumferential surface thereof, a gear insertion groove that is concavely formed on an inner circumferential surface of the opening/closing unit body so that the rotor rotating unit is accommodated in the gear insertion groove, and a gear groove that is provided along an inner circumferential surface of the gear insertion groove and engaged with the rotor rotating unit.

* * * * *